Figures 1, 2:
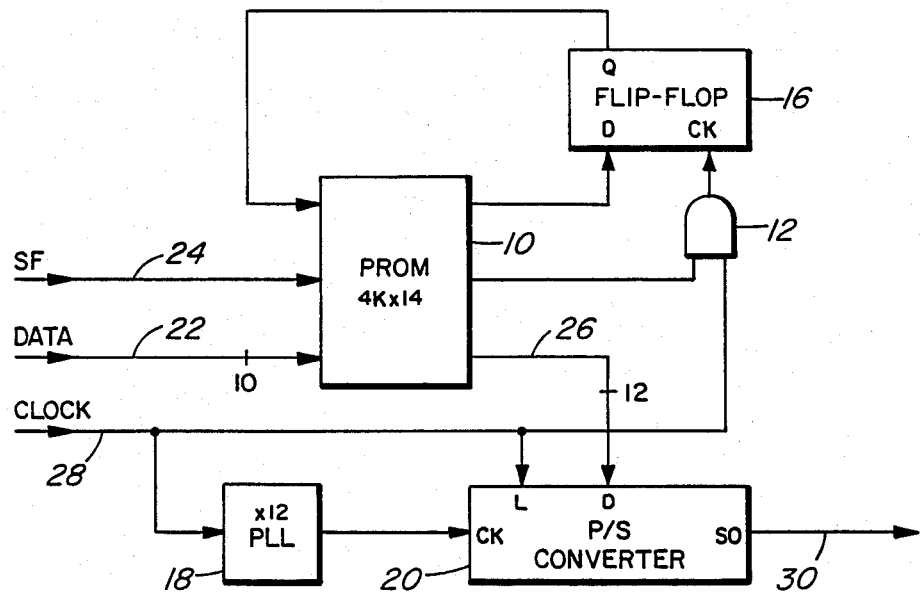

United States Patent [19]

Grover et al.

[11] Patent Number: 4,827,475
[45] Date of Patent: May 2, 1989

[54] TRANSMITTING A DIGITAL SIGNAL AND AN ADDITIONAL SIGNAL

[75] Inventors: Wayne D. Grover, Ottawa; Ernst A. Munter, Kanata, both of Canada

[73] Assignee: Northern Telecom Limited, Montreal, Canada

[21] Appl. No.: 626,895

[22] Filed: Jul. 2, 1984

[51] Int. Cl.$^4$ ............................................. H04J 3/12
[52] U.S. Cl. ................................... 370/110.1; 371/52
[58] Field of Search ...................... 370/110.1, 111, 18, 370/110.4; 371/52; 341/55, 60

[56] References Cited

U.S. PATENT DOCUMENTS

| | | | |
|---|---|---|---|
| 4,377,860 | 3/1983 | Godbole | 370/111 |
| 4,519,073 | 5/1985 | Bertocci et al. | 370/111 |
| 4,520,480 | 5/1985 | Kawai | 370/111 |

Primary Examiner—Douglas W. Olms
Attorney, Agent, or Firm—R. John Haley

[57] ABSTRACT

A digital signal, such as a t.d.m. PCM signal, is redundantly encoded in that sequences of n bits of the signal are transmitted as sequences of m bits, where $m>n$. Different sets of m-bit sequences are used to transmit the n-bit sequences in dependence upon the state of an additional signal, which may be a superframe indication signal. At a receiver, the digital signal and additional signal are reproduced. In the described embodiment $m=n+2$, providing further redundancy to facilitate providing such desirable transmission code properties as maintaining d.c. balance and detecting errors on the transmission link.

18 Claims, 2 Drawing Sheets

TRANSMITTING A DIGITAL SIGNAL AND AN ADDITIONAL SIGNAL

This invention relates to a method of and apparatus for transmitting a digital signal and an additional signal.

It is frequently necessary in the transmission of digital signals to provide facilities for transmitting an additional signal as well as the main digital signal. Such an additional signal may have an arbitrary content; for example where the main digital signal comprises data or voice channels the additional signal may comprise a control channel and/or one or more further voice channels, or the additional signal may comprise information identifying the occurrence of frames and/or superframes of the data or voice channels.

It is generally desirable for such an additional signal to be transmitted transparently with the main signal, so that at the ends of a transmission link on which the signals are transmitted the main signal is unaffected by the presence of the additional signal. In addition, it is desirable to maintain d.c. balance of the signals on the transmission link (i.e. to transmit equal numbers of ones and zeros in the case of a binary signal), and to maintain a relatively high rate of level changes in the transmitted signal in order to facilitate clock recovery at the receiving end of the transmission link. It is also desirable to facilitate providing other features, such as the detecting and correction of transmission errors.

While various schemes have been proposed for achieving the above desiderata, these suffer from various disadvantages such as requiring substantial extra circuitry or resulting in degradation of the transmitted signal.

Accordingly, an object of this invention is to provide an improved method of and apparatus for transmitting an additional signal with a digital signal.

According to this invention there is provided a method of transmitting a digital signal, comprising n-bit sequences, and an additional signal, comprising the steps of: providing first and second sets of m-bit sequences, where $m > n$, each of said first and second sets having at least as many different m-bit sequences as there are different n-bit sequences; converting each n-bit sequence of the digital signal into a respective m-bit sequence of the first set when the additional signal has a first state; converting each n-bit sequence of the digital signal into a respective m-bit sequence of the second set when the additional signal has a second state; and transmitting the m-bit sequences.

Preferably, $m >= n+2$ (m is greater than or equal to $n+2+$. In a particular embodiment of the invention described below, $n=10$ and $m=12$. This enables the particular m-bit sequences in the first and second sets to be selected to provide particular desired characteristics, such as equal or nearly-equal numbers of binary ones and zeros for good d.c. balance of the transmitted signal, and/or short runs of consecutive binary ones and zeros for simple clock recovery at a receiver.

Desirably, at least one of the first and second sets of m-bit sequences comprises $2^n$ m-bit sequences having, on average, equal numbers of binary ones and zeros. In this case the statistically distributed nature of the digital signal enables a good d.c. balance of the transmitted signal to be achieved.

Alternatively, or in addition, at least one of the first and second sets of a-bit sequences desirably comprises $2^n + p$ m-bit sequences, p being an integer, 2p of the sequences having, on average, equal numbers of binary ones and zeros. In this case preferably m is even, and each of the remaining $2^n - p$ m-bit sequences has equal numbers of binary ones and zeros. This enables a majority of the m-bit sequences each to have equal numbers of ones and zeros for good d.c. balance without any reliance on the nature of the digital signal.

In the above case conveniently said 2p of the m-bit sequences comprise a first group of p m-bit sequences each having more binary ones than zeros and a second group of p m-bit sequences each having more binary zeros than ones, m-bit sequences from said first and second groups being used alternately for the transmission of p of said n-bit sequences.

The invention also extends to a method of communicating a digital signal and an additional signal, comprising: transmitting said signals by the method recited above; receiving the transmitted m-bit sequences; converting each received m-bit sequence in the first set into the respective n-bit sequence and a first state of a reproduced additional signal; converting each received m-bit sequence in the second set into the respective n-bit sequence and a second state of the reproduced additional signal; and producing an error indication in response to any other received m-bit sequence.

In a particular application of the invention, the digital signal comprises a plurality of n-bit channels which are time division multiplexed in frames and superframes, and the additional signal comprises a frame and/or superframe indication signal.

According to another aspect of this invention there is provided apparatus for transmitting a digital signal, comprising n-bit sequences, and an additional signal, comprising: means for storing first and second sets of m-bit sequences, where $m > n$, each of said first and second sets having at least as many different m-bit sequences as there are different n-bit sequences; means for addressing the storing means with each n-bit sequence of the digital signal and with the additional signal to supply from the storing means a respective m-bit sequence of the first set when the additional signal has a first state and a respective m-bit sequence of the second set when the additional signal has a second state; and means for transmitting the m-bit sequences.

Preferably the storing means comprises means for storing and supplying, with each of said m-bit sequences, at least one additional bit, the apparatus including means responsive to the at least one additional bit supplied from the storing means with each m-bit sequence for addressing respective parts of the storing means with said digital and additional signals. The storing means can be constituted by a ROM (read-only memory), such as a PROM.

The apparatus preferably includes means for converting each m-bit sequence from a parallel sequence supplied from the storing means into a serial sequence for transmission.

The invention further extends to apparatus for communicating a digital signal and an additional signal, comprising apparatus as recited above for transmitting said signals, and apparatus for receiving the transmitted m-bit sequences, the receiving apparatus comprising: storage means for storing, in respect of at least each of the m-bit sequences in the first and second sets, the respective n-bit sequence and the respective state of the additional signal; and means for addressing the storage means with each received m-bit sequence to supply from the storage means a reproduced digital signal and a reproduced additional signal.

Conveniently the means for addressing the storage means comprises converting means for converting each m-bit sequence from a serially received sequence into a parallel sequence for addressing the storage means. Preferably the storage means comprises means for storing and producing an error signal in respect of each received m-bit sequence which is not in said sets. The apparatus desirably also includes means responsive to the error signal for controlling the converting means.

The invention will be further understood from the following description with deference to the accompanying drawings, in which:

FIG. 1 schematically illustrates in a block diagram an encoder in apparatus in accordance with an embodiment of the invention;

FIG. 2 illustrates the arrangement of a PROM in the encoder of FIG. 1; and

Figure 3:
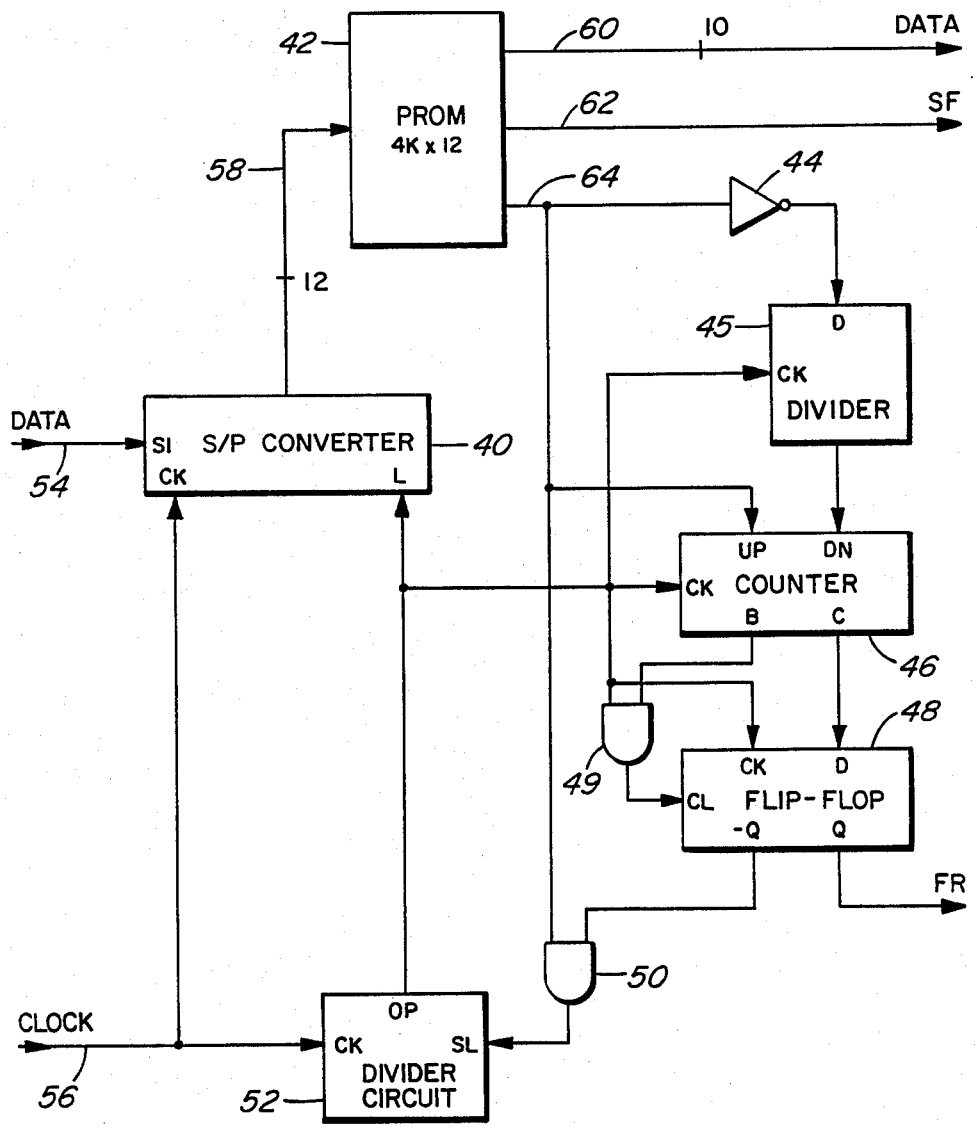

FIG. 3 schematically illustrates in a block diagram a decoder for decoding signals encoded by the encoder of FIG. 1.

In the embodiment of the invention described below, it is assumed that the main digital signal to be transmitted is a digital signal constituted by 10-bit words, referred to for convenience as data although they may comprise voice and/or data signals. For example, each 10-bit word may comprise an 8-bit PCM voice channel signal sample together with a related parity bit and a signalling bit. Furthermore, it is assumed that these 10-bit words occur in frames, each frame comprising for example 512 channels, and that the frames are grouped into superframes which are identified by a superframe signal SF which constitutes the additional signal to be transmitted.

In accordance with the invention, each 10-bit word is transmitted as a 12-bit word, the latter being produced from the former by the encoder of FIG. 1. The redundancy of this encoding is used to transmit the superframe signal in the manner described in detail below.

Referring to FIG. 1, the encoder comprises a PROM (programmable read-only memory) 10 having 4096 addressable locations each storing a 14-bit word; a two-input AND gate 12; a D-type flip-flop 16 having a data input D, a clock input CK, and an output Q; a PLL (phase-locked loop) 18; and a parallel-to-serial converter 20 having a 12-bit parallel data input D, a load input L, a clock input CK, and a serial output SO.

The PROM 10 is addressed by the 10-bit words of data incoming on lines 22, together with the signal SF supplied on a line 24 and the output Q of the flip-flop 16, to produce at its output the relevant 14-bit word from the addressed location. This 14-bit word is divided into a 12-bit word for transmission, which is supplied via lines 26 to the data input D of the converter 20, a thirteenth bit which is supplied to one input of the gate 12, and a fourteenth bit which is supplied to the data input D of the flip-flop 16. With each data word a pulse of a signal CLOCK is produced on a line 28 and is supplied to the load input L of the converter 20 to cause the 12-bit word on the lines 26 to be loaded into the converter. The signal CLOCK is also supplied to the other input of the gate 12, the output of which is connected to the clock input CK of the flip-flop 16, and to the PLL 18, which generates a clock signal at twelve times the rate of pulses on the line 28 and supplies this to the clock input CK of the converter 20 to cause the 12-bit word to be shifted out therefrom via the serial output SO to a line 30 for transmission.

Referring to FIG. 2, the PROM 10 can be considered to be divided into four parts, one of which is addressed in dependence upon the signals SF on the line 24 and Q from the flip-flop 16. These parts are referenced 32, 34, 36, and 38 in FIG. 2, each part comprising 1024 locations each of 14 bits. FIG. 2 shows the states of the thirteenth and fourteenth bits of the words in each part ("X" indicating a "don't care" bit which may be one or zero), in relation to the contents of the first 12 bits which are selected in the manner described below with additional reference to Table 1 which appears at the end of the description.

In Table 1, the numbers of 12-bit words which have particular characteristics are shown and classified into four types, type 1 to type 4. In particular, the words are classified by their weights and bit sequence lengths. The weight of a word is the number of ones which the word contains. In order to provide the desired d.c. balance in the transmitted signal, it is desirable to transmit 12-bit words which have a weight of 6, or whose weights are close to 6 and average 6.

The bit sequence lengths of the words in Table 1 are given in terms of the "head", "length", and "tail" of the words. The head is considered to be the number of consecutive similar bits (i.e. all ones or all zeros) at the start of the 12-bit word., Table 1 includes only words with a head of 1, 2, or 3. Conversely, the tail is the number of consecutive similar bits at the end of the 12-bit word, and Table 1 includes only words with a tail of 1 or 2. The length is considered to be the maximum run-length of consecutive similar bits between the head and the tail, and Table 1 includes only words having a length up to 5. In addition to showing the numbers of 12-bit words with a given head, length, and tail, Table 1 also shows the numbers of words with given sums of these values, shown as H+L+T.

In this embodiment of the invention, the 12-bit words used for transmission are selected from the words in Table 1. A total of 1744 other 12-bit words, having larger heads, lengths, and/or tails, and/or having weights greater than 8 or less than 4, are not represented in Table 1 and are not transmitted.

For most of the time the signal SF=0, i.e. a superframe identification is not to be transmitted. The incoming 10-bit data words can have any one of $2^{10}=1024$ different bit combinations. Correspondingly, at least 1024 different ones of the 12-bit words to be transmitted are required to be reserved for representing this data. These words are taken from types 1, 2, and 3 in Table 1.

Referring to Table 1, it can be seen that there are 720 12-bit words which have a weight of 6 (this being the most desired) and the required maximum values of head, length, and tail, which are classified as type 1. The further required 304 12-bit words are taken from the 304 words of weight 5 classified as type 2. As using only these words of weight 5 with the weight 6 words of type 1 would produce an unbalanced d.c. component in the transmitted signal, these weight 5 words are used alternately with a balancing set of 304 words of weight 7 classified as type 3. As there are more than 304 words of weight 5 or 7 which have the required values of head, length, and tail, the words selected for inclusion as types 2 and 3 are those with the least sum H+L+T. The remaining weight 5 and 7 words with the required values of head, length, and tail are included in the 12-bit words of type 4.

The manner in which the alternating use of the words of types 2 and 3 is achieved is described below, referring again to FIG. 2. The parts 32 and 34 of the PROM 10 which are addressed when the signal SF=0 are divided into first sub-parts 32a and 34a each having 720 address locations, and second sub-parts 32b and 34b each having 304 address locations. The 720 12-bit words of type 1 (weight 6) are stored, each with a thirteenth bit which is zero and a fourteenth bit which is of arbitrary value, at corresponding addresses in both of the sub-parts 32a and 34a of the PROM 10. The 304 12-bit words of type 2 (weight 5) are stored, each with a thirteenth bit which is one and a fourteenth bit which is one, at addresses in the sub-part 32b of the PROM 10, and the 304 12-bit words of type 3 (weight 7) are stored, each with a thirteenth bit which is one and a fourteenth bit which is zero, at corresponding addresses in the sub-part 34b of the PROM 10.

In operation, with the signal SF=0 and assuming that initially the Q output of the flip-flop 16 is zero (Q=0), the part 32 of the PROM 10 is addressed by the incoming 10-bit data words. While the sub-part 32a is being addressed, the thirteenth bit supplied to the gate 12 remains zero, so that the flip-flop 16 is not clocked and its output remains Q=0. In this situation 12-bit words of weight 6 (d.c. balanced) are transmitted. When the sub-part 32b of the PROM 10 is addressed, a 12-bit word of weight 5 is transmitted and, with the thirteenth and fourteenth bits both one, the flip-flop 16 is clocked and supplied with data so that its output becomes Q=1.

Now, with the signals SF=0 and Q=1, the part 34 of the PROM 10 is addressed in the same manner. While the sub-part 34a is being addressed, the flip-flop 16 is not clocked (bit 13=0) and there is no change. When the sub-part 34b is addressed, a 12-bit word of weight 7 is transmitted and, with bit 13=1 and bit 14=0, the flip-flop 16 is clocked so that its output becomes Q=0.

The above sequences continue, with words of weight 6 or alternately 5 and 7 being transmitted to maintain d.c. balance of the transmitted data.

When a superframe indication is to be transmitted, the signal SF=1 to cause the parts 36 and 38 of the PROM 10 to be addressed. For the 1024 bit combinations of the 10-bit words which may occur when the signal SF=1, the 1024 12-bit words of type 4 are used. As shown in Table 1, the 1024 words of type 4 comprise the remaining 262 words of each of weights 5 and 7 which have the required head, length, and tail, together with 250 words of each of weights 4 and 8 which have the required head, length, and tail and which have the smallest sums H+L+T. These words are stored in the 1024 address locations of the part 36 of the PROM 10, and in corresponding address locations of the part 38 of the PROM, in each case with bit 13=0 and bit 14 being of arbitrary value.

Thus when the signal SF=1, the 10-bit data incoming on the lines 22 addresses the part 36 or 38, depending upon the signal Q from the flip-flop 16, of the PROM 10 to cause in either case the same 12-bit word to be supplied to the lines 26 for transmission. At the same time, with the thirteenth bit at the addressed location being zero, the flip-flop 16 is not clocked so that there is no change in the state of the signal Q. This situation continues until the signal SF again becomes zero.

It should be appreciated from the foregoing description that while the signal SF=1 d.c. balance of the transmitted 12-bit words is dependent upon the statistical nature of the incoming 10-bit data, rather than being constrained by the use of alternating 12-bit words of complementary weight as described above with the signal SF=0. This is of little consequence in the present embodiment in which the signal SF=1 occurs relatively infrequently. In this respect it is observed that the signal SF=1 may occur for a relatively arbitrary duration, for example for the duration of one frame or for the duration of one or more 10-bit words on the lines 24, depending on the period over which statistical balance is to be achieved.

From the above description it should be appreciated that the presence on the line 30 of one of the 12-bit words of types 1, 2 and 3 represents a 10-bit word and the signal SF=0, the presence of one of the 12-bit words of type 4 represents a 10-bit word and the signal SF=1, and the presence of any other 12-bit word represents an error. FIG. 3 illustrates a decoder which may be used to recover the 10-bit data words and the signal SF from the 12-bit words on the line 30 at a receiving end of the line, and to detect errors.

Referring to FIG. 3, the decoder comprises a latching serial to parallel converter 40 having a serial input SI, a clock input CK, and a latch control input L; a PROM 42 having 4096 addressable locations each storing a 12-bit word; an inverter 44; a divider 45 having a clock input CK and a data input D; an up-down counter 46 having up and down count control inputs UP and DN respectively, a clock input CK, and borrow and carry outputs B and C respectively; a D-type flip-flop 48 having a data input D, a clock input CK, a clear input CL, and complementary outputs Q and −Q; AND gates 49 and 50; and a divider circuit 52 having a clock input CK, a slip control input SL, and an output OP.

Received data, transmitted from the line 30 in FIG. 1, is supplied via a line 54 to the serial input SI of the converter 40. A clock signal CLOCK is recovered from the received data signal in known manner and is supplied via a line 56 to the inputs CK of the converter 40 and the divider 52. Consequently the data on the line 54 is shifted into the converter 40. In a normal situation in which a logic zero is present at the input SL of the divider 52, the divider produces one pulse at its output OP for every twelve pulses of the signal CLOCK, which pulse is applied to the input L of the converter 40 to cause the 12 data bits therein to be latched at its outputs and applied to address inputs of the PROM 42 via lines 58.

The divider 52 can be constituted by a counter which, with the input signal SL=0, counts to 12 and produces an output pulse for every 12 clock pulses. With the input signal SL=1, as described below an output pulse is produced after a different number of clock pulses, for example 11 or 13 depending upon the desired direction of slip. This can be achieved by appropriate gating of the counter to count to 11 or 13 instead of 12 when the signal SL=1.

The PROM 42 stores a 12-bit word in each of its addressable locations, which word comprises the decoded 10-bit data together with a superframe indication bit and an error indication bit, these being supplied from the PROM 42 on lines 60, 62, and 64 respectively.

For each location in the PROM 42 which is addressed by a 12-bit word of type 1, 2, or 3, the PROM stores the corresponding 10-bit data word, and zeros as the superframe and error indication bits because these 12-bit words are valid words produced when the signal SF=0. For each location which is addressed by a 12-bit word of type 4, the PROM 42 stores the corresponding 10-bit data word together with a one as the superframe indication bit and a zero as the error indication bit, because these 12-bit words are valid words produced when the signal SF=1. In all of its other 1744 addressable locations the PROM 42 stores a one as the error indication bit, because the 12-bit words which correspond to these locations only occur in response to a transmission error or an out-of-synchronism situation. As the other 11 bits in these locations the PROM 42 desirably stores the most likely correctly decoded word and superframe indication bit, so that decoding of the transmitted data may be correct in spite of a transmission error.

The error indication bit read out from the PROM 42 on the line 64 is supplied directly to the input UP of the counter 46, and via the inverter 44 to the input D of the divider 45, an output of which is connected to the input DN of the counter 46. Pulses of the output OP of the divider 52 are applied to the clock inputs CK of the divider 45, counter 46, and flip-flop 48, and to one input of the gate 49. The counter 46 is consequently controlled to count up in response to each logic one error indication bit which represents an error, and down in response to a plurality (depending on the division factor of the divider 45) of logic zero error indication bits, between a zero count at which it produces a borrow signal at its output B and a predetermined maximum count at which it produces a carry signal at its output C.

The carry signal is applied to the input D of the flip-flop 48, and the borrow signal is applied to the other input of the gate 49, the output of which is applied to the input CL of the flip-flop 48. The —Q output of the flip-flop 48 is applied to one input, and the error indication bit on the line 64 is applied to the other input, of the AND gate 50, which produces at its output the signal applied to the input SL of the divider 52. The Q output of the flip-flop 48 provides a signal FR which is a logic one during synchronized operation of the decoder.

Assuming that initially the decoder is unsynchronized, the incoming 12-bit words which address the PROM 42 will contain a large number of invalid words, i.e. words which are not included in Table 1. Accordingly, logic ones will occur frequently on the line 64, causing the counter 46 to count up to its maximum count and produce a carry signal which clears the flip-flop 48 to produce the signal FR=0, indicating no synchronization, and to enable the AND gate 50. Subsequent error indication bits which are a logic one, indicating errors, are each passed by the gate 50 to the input SL of the divider 52 to modify its division factor as described above, to cause a one-bit slip of the timing of the output OP of the divider relative to its input.

Conversely, valid 12-bit words which address the PROM 42 produce logic zeros on the line 64, which do not cause any bit slip of the divider 52 but are divided by the divider 45 to cause the counter 46 to count down, at a slower rate than the counting up. When the count of the counter reaches zero, the counter produces a borrow signal which clears the flip-flop 48 so that this changes state to disable the AND gate 50 and produce the signal FR=1, indicating synchronization and hence that the signals on the lines 60 and 62 are valid.

From the above description it can be seen that synchronism is rapidly established, whereupon the signal FR=1 persists unless a sufficient number of errors occur to cause the counter again to reach its maximum count. This maximum count can be one or more, the particular maximum count selected depending upon such factors as the desired degree of protection against transmission line errors.

Although the embodiment of the invention described above relates to the transmission of a superframe signal as the additional signal, the invention is not limited in this respect. On the contrary, the principles of the invention may be equally applied to the transparent transmission of any type of additional signal with any type of main digital signal. Generally considered, the invention comprises transmitting a main digital signal redundantly (i.e. using more bits than are necessary), and selecting different redundant bit combinations for bit sequences of the main digital signal in dependence upon the state of the additional signal. As in the above described embodiment, other redundant bit combinations may be unused, so that detection of these at a receiver indicates an error condition.

It should also be appreciated that, although in the above described embodiment of the invention the PROM 10 in the encoder stores duplicated information in the parts 36 and 38, and also in the sub-parts 32a and 34a, the encoder could instead be provided with additional circuitry to avoid the need for such duplicated storage. Furthermore, in this or other applications the use of complementary weights of redundant bit combinations to maintain d.c. balance may be dispensed with, any necessary d.c. balance being provided by the statistical nature of the incoming data signals. Alternatively, d.c. balance may be maintained by using complementary weights of redundant bit combinations for both states of the additional signal.

Furthermore, the above-described selections of 12-bit words based on weights and bit sequence lengths may be changed to facilitate providing other desirable features. For example, the 12-bit words which are selected for transmission may be chosen to provide at least partial single error correction, at the expense of d.c. balance and ease of clock recovery. Alternatively, the 12-bit words may be chosen to facilitate their encoding and decoding, whereby smaller capacity PROMs may be used. In a more general sense, this may be achieved by the described redundant 10/12 bit encoding even without using such redundancy in accordance with the invention for transmitting an additional signal.

In addition, the invention is applicable to different word lengths of both the incoming and the encoded digital signals, provided that the length of the encoded words is greater than that of the incoming data words to provide the necessary redundant encoding. In this respect it is also observed that the incoming data need not necessarily be already divided up into words; incoming bit sequences of arbitrary length can be divided into words of appropriate length purely for the encoding process as described above.

Numerous other modifications, variations, and adaptations may be made to the particular embodiment of the invention described above without departing from the scope of the invention, which is defined by the claims.

TABLE 1

| VALUE: | 1 | 2 | 3 | 4 | 5 | 6 | 7 | 8 | 9 | 10 |
|---|---|---|---|---|---|---|---|---|---|---|
| TYPE 1 | | | | | | | | | | |

TABLE 1-continued

| VALUE: | 1 | 2 | 3 | 4 | 5 | 6 | 7 | 8 | 9 | 10 |
|---|---|---|---|---|---|---|---|---|---|---|
| WEIGHT: | 0 | 0 | 0 | 0 | 0 | 720 | 0 | 0 | 0 | 0 |
| HEAD: | 420 | 210 | 90 | 0 | 0 | 0 | 0 | 0 | 0 | 0 |
| LENGTH: | 4 | 222 | 322 | 140 | 32 | 0 | 0 | 0 | 0 | 0 |
| TAIL: | 480 | 240 | 0 | 0 | 0 | 0 | 0 | 0 | 0 | 0 |
| H + L + T: | 0 | 0 | 2 | 98 | 212 | 206 | 130 | 52 | 16 | 4 |
| TYPE 2 | | | | | | | | | | |
| WEIGHT: | 0 | 0 | 0 | 0 | 304 | 0 | 0 | 0 | 0 | 0 |
| HEAD: | 227 | 66 | 11 | 0 | 0 | 0 | 0 | 0 | 0 | 0 |
| LENGTH: | 3 | 119 | 151 | 31 | 0 | 0 | 0 | 0 | 0 | 0 |
| TAIL: | 231 | 73 | 0 | 0 | 0 | 0 | 0 | 0 | 0 | 0 |
| H + L + T: | 0 | 0 | 0 | 40 | 157 | 107 | 0 | 0 | 0 | 0 |
| TYPE 3 | | | | | | | | | | |
| WEIGHT: | 0 | 0 | 0 | 0 | 0 | 0 | 304 | 0 | 0 | 0 |
| HEAD: | 226 | 62 | 16 | 0 | 0 | 0 | 0 | 0 | 0 | 0 |
| LENGTH: | 3 | 114 | 141 | 46 | 0 | 0 | 0 | 0 | 0 | 0 |
| TAIL: | 257 | 47 | 0 | 0 | 0 | 0 | 0 | 0 | 0 | 0 |
| H + L + T: | 0 | 0 | 0 | 40 | 157 | 107 | 0 | 0 | 0 | 0 |
| TYPE 4 | | | | | | | | | | |
| WEIGHT: | 0 | 0 | 0 | 250 | 262 | 0 | 262 | 250 | 0 | 0 |
| HEAD: | 485 | 336 | 203 | 0 | 0 | 0 | 0 | 0 | 0 | 0 |
| LENGTH: | 2 | 107 | 348 | 361 | 206 | 0 | 0 | 0 | 0 | 0 |
| TAIL: | 606 | 418 | 0 | 0 | 0 | 0 | 0 | 0 | 0 | 0 |
| H + L + T: | 0 | 0 | 0 | 2 | 64 | 332 | 416 | 182 | 26 | 2 |

What is claimed is:

1. A method of transmitting a digital signal, comprising n-bit sequences, and an additional signal, comprising the steps of:
providing first and second sets of m-bit sequences, where m>n, each of said first and second sets having at least as many different m-bit sequences as there are different n-bit sequences;
converting each n-bit sequence of the digital signal into a respective m-bit sequence of the first set when the additional signal has a first state;
converting each n-bit sequence of the digital signal into a respective m-bit sequence of the second set when the additional signal has a second state; and
transmitting the m-bit sequences.

2. A method as claimed in claim 1 wherein m>=n+2.

3. A method as claimed in claim 1 wherein at least one of the first and second sets of m-bit sequences comprises $2^n$ m-bit sequences having, on average, equal numbers of binary ones and zeros.

4. A method as claimed in claim 1 wherein at least one of the first and second sets of m-bit sequences comprises $2^n+p$ m-bit sequences, p being an integer, 2p of the sequences having, on average, equal numbers of binary ones and zeros.

5. A method as claimed in claim 4 wherein m is even, and each of the remaining $2^n-p$ m-bit sequences has equal numbers of binary ones and zeros.

6. A method as claimed in claim 5 wherein said 2p of the m-bit sequences comprise a first group of p m-bit sequences each having more binary ones than zeros and a second group of p m-bit sequences each having more binary zeros than ones, m-bit sequences from said first and second groups being used alternately for the transmission of p of said n-bit sequences.

7. A method as claimed in claim 3 wherein n=10 and m=12.

8. A method of communicating a digital signal and an additional signal, comprising:
transmitting said signals by the method of claim 6;
receiving the transmitted m-bit sequences;
converting each received m-bit sequence in the first set into the respective n-bit sequence and a first state of a reproduced additional signal;
converting each received m-bit sequence in the second set into the respective n-bit sequence and a second state of the reproduced additional signal; and
producing an error indication in response to any other received m-bit sequence.

9. A method as claimed in claim 1 wherein the digital signal comprises a plurality of n-bit channels which are time division multiplexed in frames and superframes, and wherein the additional signal comprises a frame and/or superframe indication signal.

10. Apparatus for transmitting a digital signal, comprising n-bit sequences, and an additional signal, comprising:
means for storing first and second sets of m-bit sequences, where m>n, each of said first and second sets having at least as many different m-bit sequences as there are different n-bit sequences;
means for addressing the storing means with each n-bit sequence of the digital signal and with the additional signal to supply from the storing means a respective m-bit sequence of the first set when the additional signal has a first state and a respective m-bit sequence of the second set when the additional signal has a second state; and
means for transmitting the m-bit sequences.

11. Apparatus as claimed in claim 10 wherein the storing means comprises means for storing and supplying, with each of said m-bit sequences, at least one additional bit, the apparatus including means responsive to the at least one additional bit supplied from the storing means with each m-bit sequence for addressing respective parts of the storing means with said digital and additional signals.

12. Apparatus as claimed in claim 10 wherein the storing means comprises a ROM (read-only memory).

13. Apparatus as claimed in claim 10 and including means for converting each m-bit sequence from a parallel sequence supplied from the storing means into a serial sequence for transmission.

14. Apparatus for communicating a digital signal and an additional signal, comprising apparatus as claimed in claim 10 for transmitting said signals, and apparatus for receiving the transmitted m-bit sequences, the receiving apparatus comprising:

storage means for storing, in respect of at least each of the m-bit sequences in the first and second sets, the respective n-bit sequence and the respective state of the additional signal; and means for addressing the storage means with each received m-bit sequence to supply from the storage means a reproduced digital signal and a reproduced additional signal.

15. Apparatus as claimed in claim 14 wherein there are more m-bit sequences than are in said first and second sets, the apparatus including means responsive to each received m-bit sequence which is not in said sets for producing an error signal.

16. Apparatus as claimed in claim 14 wherein the means for addressing the storage means comprises converting means for converting each m-bit sequence from a serially received sequence into a parallel sequence for addressing the storage means.

17. Apparatus as claimed in claim 16 wherein the storage means comprises means for storing and producing an error signal in respect of each received m-bit sequence which is not in said sets.

18. Apparatus as claimed in claim 17 and including means responsive to the error signal for controlling the converting means.

* * * * *